ELECTROMECHANICAL FILTER HAVING MEANS TO REDUCE HARMONIC TRANSMISSION

Filed Aug. 27, 1962

United States Patent Office 3,293,575

Patented Dec. 20, 1966

3,293,575
ELECTROMECHANICAL FILTER HAVING MEANS TO REDUCE HARMONIC TRANSMISSION

Hans Albsmeier, Munich, Germany, assignor to Siemens & Halske Aktiengesellschaft Berlin and Munich, a corporation of Germany Filed Aug. 27, 1962, Ser. No. 219,564
Claims priority, application Germany, Sept. 29, 1961, S 76,058
3 Claims. (Cl. 333—72)

The invention disclosed herein is concerned with an electromechanical filter comprising at least one metallic resonator which is excited to oscillate according to the longitudinal mode, said resonator being at each end provided with an electrostrictive triggering element which is made in the form of a thin disk of electrostrictive material, such disk being metallized on the side thereof which faces away from the metallic resonator.

A filter of this kind may comprise a single resonator which is to be used in a circuit in the manner of a dipole, or it may comprise a plurality of mechanically coupled resonators which are operated as quadrupoles, such operation being accomplished with the aid of appropriate electrostrictive alternator- or triggering elements at the first and in given conditions also at the last resonator. Triggering elements of this kind are described, for example, in the Argentine Patent No. 126,261. Such structures pose problems with respect to the frequency band width that may be obtained for the individual resonator elements which are provided with the triggering elements, which band width may be insufficient for given requirements. Moreover, disturbing attenuation phenomena often appear in the neighborhood of the frequencies of the even and odd multiples of the fundamental frequency of the respective resonance element, such phenomena becoming disturbingly noticeable upon using the resonance element as a dipole as well as in operation thereof as a quadrupole.

The object of the present invention is primarily to counter in simple manner the difficulties with respect to the frequency band width and the attenuation phenomena.

In accordance with the invention, this object is, in connection with an electromechanical filter of the initially indicated kind, realized by the provision of a further disk of electrostrictive material, disposed adjacent the metallized end of the disk of electrostrictive material, such further disk being at its free end surface likewise metallized to serve as an electrical terminal.

A thin metal disk may be advantageously provided at the free side of the disk of electrostrictive material, merging with the metallization of the latter, thereby obtaining a further increase of the degree of coupling of the reactive force drive.

The two triggering elements are advantageously similarly constructed. It is thereby of advantage, so far as the circuitry is concerned, to interconnect, at least for alternating current flow, metallizing lying similarly with respect to the oscillation node of the longitudinal mode resonator.

The longitudinal mode resonators are advantageously formed with a beam-like or with a circular cross-section. The resonators are advantageously secured by means of holding wires engaging the respective resonators laterally in the oscillation node thereof and being preferably anchored in place by spot welding.

The resonator according to the invention, provided with the triggering element, can be advantageously used in a quadrupole filter by coupling it with further resonators purely mechanically by transverse contraction coupling and/or by shear coupling or bending coupling, forming with the resonator a mechanically compact filter unit which is over the holding wires of the resonator preferably firmly anchored in a housing.

Further details of the invention will appear from the description which is rendered below with reference to the accompanying drawing.

The illustrated embodiments are not drawn to scale, parts being shown greatly enlarged to bring out details more clearly.

Figure 1:
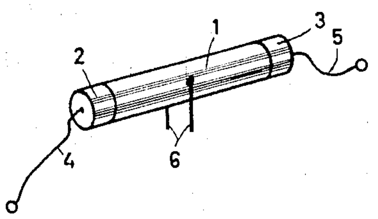
FIG. 1 shows a filter comprising a longitudinal mode resonator made of a steel rod, providing at its ends with disks, made of electrostrictive material, for example, barium titanate.

In FIG. 1, the disks 2 and 3 of electrostrictive material, for example, barium titanate are fastened to the steel rod 1, for example, by soldering, such disks being at their free end surfaces provided with metallizing, for example, with layers of gold or silver. To these layers are soldered thin terminal wires respectively indicated at 4 and 5, such wires being so long and so thin that they do not disturb the longitudinal oscillation.

Such an oscillator may be operated as a quadrupole, for example, by effecting the feed (input) between the terminal wire 4 and the metallic holding wires 6 which are spot welded to the resonator 1 in the oscillation node thereof, and obtaining the output at the terminal wire 5 and the holding wires 6.

Figure 2:
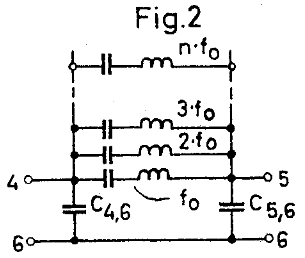
FIG. 2 represents an equivalent circuit for the filter shown in FIG. 1.

The equivalent circuit for such a filter, shown in FIG. 2, indicates that there are in addition to the fundamental frequency $f_0$, also pass ranges for all harmonics thereof.

Figure 3:
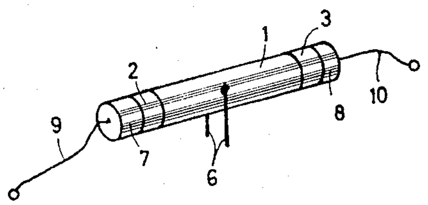
FIG. 3 illustrates a filter embodying the invention.

It is possible to appreciably reduce the harmonics by connecting with the metallized layers of the disks 2 and 3, for example, by soldering, further disks 7 and 8, as shown in FIG. 3, the free end surfaces of such further disks 7 and 8 being likewise metallized.

It is to be considered in this connection that, if the terminal wires 4, 5 and the terminal wires 9, 10, are interconnected, the resonator will be operable as a quadrupole wherein the feed is effected between the interconnected terminals 4, 5 and the holding wires 6 and wherein the output is obtained between the interconnected terminals 9, 10 and the holding wires 6.

Figure 4:
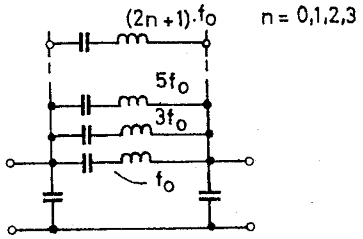
FIG. 4 is an equivalent circuit for the filter shown in FIG. 3.

There will then be obtained a substitution circuit according to FIG. 4, that is, the even numbered hamonics, and especially the particularly disturbing second harmonic, have disappeared.

Figure 5:
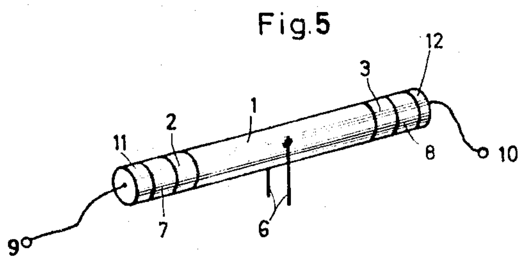
FIG. 5 shows a further embodiment of the invention.

According to the invention, the coupling for the reactive force drive may be further improved by anchoring or bonding to the metallizing of the disks 7, 8, made of electrostrictive material, thin metal disks 11, 12, as shown in FIG. 5.

Changes may be made within the scope and spirit of the appended claims which define what is believed to be new and desired to have protected by Letters Patent.

I claim:

1. An electromechanical filter having at least one elongated metallic resonator vibrating in longitudinal direction, said resonator being provided at each of its longitudinal ends with an electrostrictive excitation element in the form of a thin disk metalized on the side thereof which faces away from the metallic resonator to pass a fundamental frequency, a further pair of disks of electrostrictive material adapted to reduce harmonics of said fundamental frequency, each of said last mentioned disks being disposed contiguous to the metalized coating of a corresponding first mentioned disk, the free end surface of each of said second mentioned disks being provided at its free end surface with a metalized coating serving as an electrical contact for effecting electrical connection thereto.

2. A filter according to claim 1, wherein the excitation elements at the respective ends of the resonator are of like construction and connected to metalized coatings which are symmetrically disposed with respect to a vibration node of the resonator, at least certain symmetrical metalized coatings being interconnected, at least with respect to the flow of alternating current.

3. A filter according to claim 1, comprising holding wires for securing the resonator, said holding wires engaging the resonator laterally in the oscillation node thereof and being suitably anchored thereto.

References Cited by the Examiner

UNITED STATES PATENTS

| | | | |
|---|---|---|---|
| 2,759,102 | 8/1956 | Burns | 333—72 |
| 2,859,415 | 11/1958 | Fagen | 333—30 |
| 2,861,247 | 11/1958 | McSkimin | 333—30 |
| 2,982,926 | 5/1961 | May | 333—71 |
| 3,015,789 | 1/1962 | Honda et al. | 333—72 |
| 3,105,208 | 9/1963 | Tanaka et al. | 333—71 |

HERMAN KARL SAALBACH, *Primary Examiner.*

C. BARAFF, *Assistant Examiner.*